(12) United States Patent
Margraf

(10) Patent No.: US 10,527,108 B2
(45) Date of Patent: Jan. 7, 2020

(54) CLUTCH ASSEMBLY

(71) Applicant: ZF Friedrichshafen AG, Friedrichshafen (DE)

(72) Inventor: Christoph Margraf, Markdorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 213 days.

(21) Appl. No.: 15/708,622

(22) Filed: Sep. 19, 2017

(65) Prior Publication Data

US 2018/0080506 A1    Mar. 22, 2018

(30) Foreign Application Priority Data

Sep. 21, 2016   (DE) .......................... 10 2016 218 166

(51) Int. Cl.
| | |
|---|---|
| F16D 25/0635 | (2006.01) |
| F16D 25/12 | (2006.01) |
| F16D 48/02 | (2006.01) |
| F16D 25/0638 | (2006.01) |
| F16D 13/68 | (2006.01) |

(52) U.S. Cl.
CPC ..... *F16D 25/0635* (2013.01); *F16D 25/0638* (2013.01); *F16D 25/12* (2013.01); *F16D 25/14* (2013.01); *F16D 13/683* (2013.01); *F16D 2300/08* (2013.01)

(58) Field of Classification Search
None
See application file for complete search history.

(56) References Cited

U.S. PATENT DOCUMENTS

| | | | |
|---|---|---|---|
| 2,876,743 A | * | 3/1959 | Maki .................. F16D 25/0635 92/108 |
| 4,706,789 A | | 11/1987 | McColl et al. |
| 4,709,795 A | | 12/1987 | Ferris |
| 6,021,879 A | | 2/2000 | Pelouch |
| 6,193,042 B1 | | 2/2001 | Kempf et al. |
| 2015/0226276 A1 | | 8/2015 | Heuver et al. |

FOREIGN PATENT DOCUMENTS

| | | |
|---|---|---|
| DE | 10323515 A1 | 12/2004 |
| DE | 102015202104 A1 | 8/2015 |
| JP | H028514 A | 1/1990 |
| JP | 2007051651 A | 3/2007 |
| JP | 2009197851 A | 3/2007 |

OTHER PUBLICATIONS

German Search Report DE102016218166.1, dated Mar. 20, 2017. (7 pages).

* cited by examiner

*Primary Examiner* — Mark A Manley
(74) *Attorney, Agent, or Firm* — Dority & Manning, P.A.

(57) ABSTRACT

A rotating shifting element arrangement for an automatic transmission of a vehicle, having a cylinder element (2), is proposed, in which an actuating piston (3) for actuating a shifting element (1) is arranged in an axially movable way, a compensating cavity (4) of the shifting element (1) being provided by way of the actuating piston (3) and an oil dam (5), and wherein the oil dam (5) is fixed radially outside the piston face (6) of the actuating piston (3).

6 Claims, 2 Drawing Sheets

CLUTCH ASSEMBLY

FIELD OF THE INVENTION

The present invention relates generally to a rotating shifting element arrangement in an automatic transmission of a vehicle.

BACKGROUND

Rotating shifting element arrangements are well known from vehicle technology. The shifting elements are usually provided in a housing of a transmission, in particular in an automatic transmission, and are usually actuated hydraulically. To this end, a hydraulically actuated actuating piston is provided which is arranged such that it can be moved in the axial direction in order to actuate the shifting element. A compensating cavity is provided for compensating dynamic forces as a consequence of the centrifugal force. The compensating cavity is usually formed by the actuating piston and by an oil dam. The oil dam is usually configured as a sheet metal part and is fixed on the inner diameter of the cylinder which receives the actuating piston.

The high component loading on the oil dam in the region of where the oil dam is fixed is disadvantageous in the case of the known shifting element arrangement, with the result that considerable component dimensions are required in the case of the oil dam, in order to ensure the sufficient mechanical strength. As a result, not only the manufacturing costs but also the installation space requirement are increased.

SUMMARY OF THE INVENTION

Example aspects of the present invention improve a shifting element arrangement of the type mentioned at the outset, in such a way that an installation space requirement which is as low as possible and manufacturing costs which are as low as possible are realized.

Therefore, a rotating shifting element arrangement for an automatic transmission of a vehicle is proposed. The shifting element arrangement includes, for example, a shifting element which is arranged in a housing of the automatic transmission and can be actuated hydraulically via an actuating piston which is arranged such that the actuating piston is movable axially in a cylinder element. A compensating cavity is provided in the cylinder element in order to compensate for dynamic pressures and/or forces. The compensating cavity is formed by the actuating piston and an oil dam. In order to reduce the mechanical loads on the oil dam and, as a result, also the component dimensions, the oil dam is provided according to example aspects of the invention such that the oil dam is fixed radially outside the piston face of the actuating piston.

In this way, a particularly advantageous attachment of the oil dam in the case of the dynamically pressure-equalized shifting element is realized on the outer diameter of the oil dam or radially outside the piston face of the actuating piston. Accordingly, an oil dam with a low material thickness, for example a thin sheet metal disk or the like, can be used, since the component loads of the fixing means of the oil dam on the large outer diameter are reduced considerably.

It is provided within the context of one advantageous example embodiment that, on an outer diameter of the oil dam, the oil dam has a radially projecting driving profile which engages into a driving spline or the like of the cylinder element. This results in a structurally simple fixing means of the oil dam, for example, by a positively locking connection. It is also conceivable that other fastening types are used, for example, non-positive or frictionally locking fastening types. The positively locking connection is particularly advantageous, however, since, for example, an existing driving spline of a clutch plate carrier of the shifting element can be used to this end.

A further advantageous structural example embodiment of the invention can provide that an eject diameter of the oil dam is realized on the inner diameter of the oil dam in a structurally simple manner by way of an angled-away portion or the like. As a result, the openings which are otherwise customary are not necessary, with the result that the component stiffness is increased further in the case of the shifting element arrangement according to example aspects of the invention.

The use of the proposed shifting element arrangement in the housing of an automatic transmission or double clutch transmission with preferably frictionally locking shifting elements, such as multi-disk clutches and multi-disk brakes, is particularly advantageous.

BRIEF DESCRIPTION OF THE DRAWINGS

In the following text, example aspects of the present invention will be described further using the drawings, in which.

DETAILED DESCRIPTION

Figure 1:
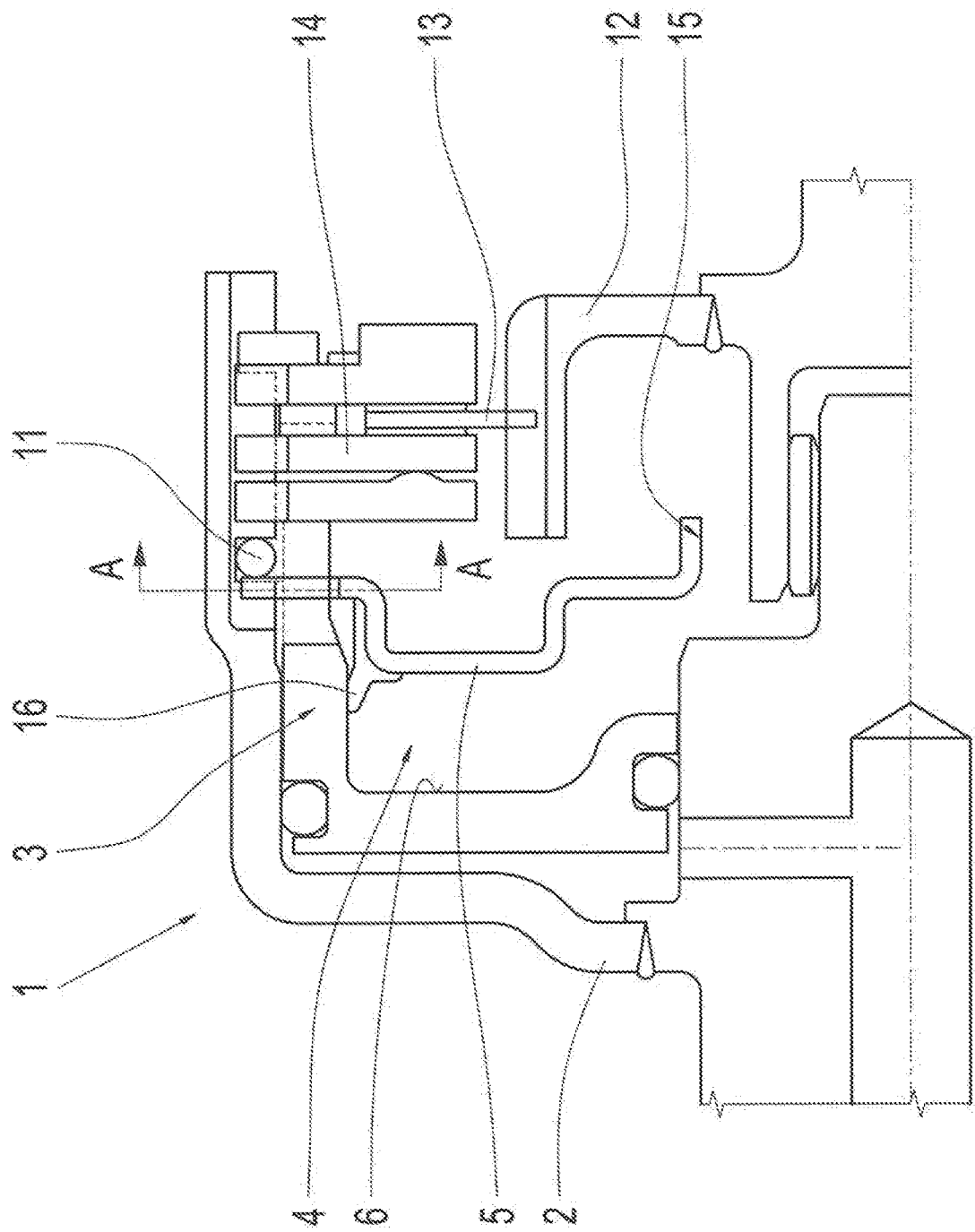
FIG. 1 shows a diagrammatic sectional view of one possible design variant of a shifting element arrangement according to an example embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
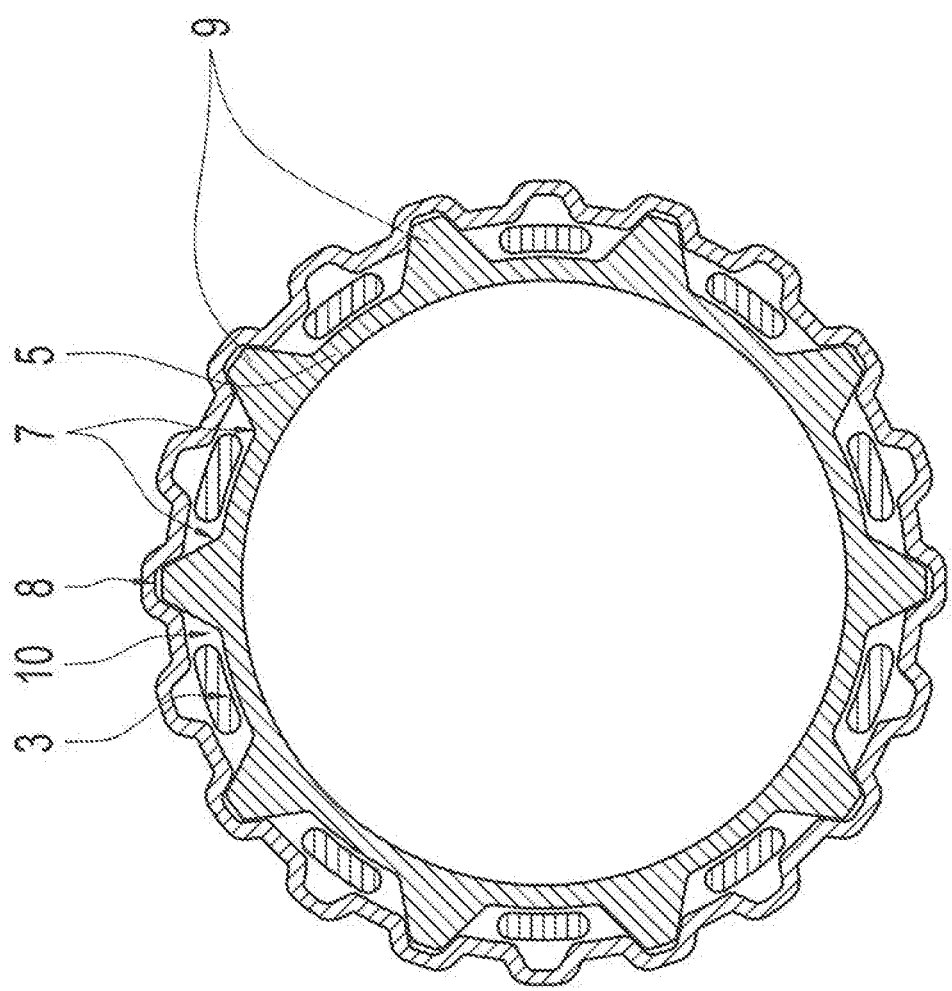
FIG. 2 shows a sectional view of the example shifting element arrangement along the sectional line A-A in FIG. 1.

FIGS. 1 and 2 show one design variant of a shifting element arrangement according to the invention by way of example.

The shifting element arrangement according to the invention includes a rotating shifting element which is provided, for example, as a multi-disk clutch 1. The multi-disk clutch 1 includes a cylinder element 2, in which an actuating piston 3 is arranged in an axially movable way for actuating the multi-disk clutch 1. In order to move the actuating piston 3 axially, the cylinder element 2 is charged with hydraulic medium or oil. Corresponding supply bores are provided in the housing in the region of the multi-disk clutch 1 to this end. A compensating cavity 4 is provided in the cylinder element 2 in order to compensate for dynamic forces. The compensating cavity 4 is delimited by the actuating piston 3 and by an oil dam 5. Sealing between the oil dam 5 and the actuating piston 3 is realized by way of a sealing element 16.

In order to configure the oil dam 5 in a particularly space-saving manner and with small dimensions, the oil dam 5 is fixed radially outside the piston face 6 of the actuating piston 3. As a result, the oil dam 5 can advantageously be configured as a thin metal sheet which makes a reduced component length on the inner diameter of the cylinder element 2 possible. As a result, the manufacturing costs both for the oil dam 5 and for the cylinder element 2 and the actuating piston 3 can be reduced. Therefore, a particularly inexpensive shifting element arrangement can be realized overall.

On an outer diameter of the oil dam 5, the oil dam 5 has a radially projecting driving profile 7 which engages into a driving spline 8 of the cylinder element 2. In the case of the example design variant which is shown here, the cylinder element 2 at the same time forms the outer disk carrier of the multi-disk clutch 1. In the multi-disk clutch 1, the outer disk carrier and the outer clutch disks 14 are held rotationally fixed but such that the outer disk carrier and the outer clutch disks 14 are axially displaceable.

The driving profile 7 of the oil dam 5 has a plurality of driving teeth 9 which are arranged distributed over the circumference, in order to realize a circumferential securing mechanism of the oil dam 5. In each case, one recess 10 for the actuating piston 3 to reach through axially is provided radially outside or above the seal diameter of the oil dam 5 between respective adjacent driving teeth 9. The circumferential securing mechanism of the oil dam 5 is provided on the outer diameter in this way.

The axial securing mechanism of the oil dam 5 is realized by way of a snap ring 11 or the like. To this end, the snap ring 11 bears on the axial side against the outer ends of the driving teeth 9 of the oil dam 5. The component loading is reduced by way of said type of snap ring securing on the large diameter.

The fact that the fixing of the oil dam 5 takes place on the outer diameter additionally results in a structurally simple possibility of configuring an eject diameter of the oil dam 5 on the inner diameter. The eject diameter is formed by way of an angled-away open end 15 of the oil dam 5.

In summary, a shifting element arrangement is proposed, in the case of which the outer disk carrier of the multi-disk clutch 1 is formed by the cylinder element 2, a driving spline 8 for holding the outer clutch disks 14 being provided on the outer disk carrier. Furthermore, an inner disk carrier 12 is provided for holding the internal clutch disks 13. The oil dam 5 is fastened by way of its driving profile 7 to the driving spline 8 of the outer disk carrier, just like the outer clutch disks 14, which driving spline 8 is provided radially on the outside.

Modifications and variations can be made to the embodiments illustrated or described herein without departing from the scope and spirit of the invention as set forth in the appended claims.

LIST OF DESIGNATIONS

1 Shifting element as multi-disk clutch
2 Cylinder element
3 Actuating piston
4 Compensating cavity
5 Oil dam
6 Piston face
7 Driving profile
8 Driving spline
9 Driving teeth
10 Recess
11 Snap ring
12 Inner disk carrier
13 Internal clutch disks
14 Outer clutch disks
15 Angled-away open end
16 Sealing element

The invention claimed is:

1. A clutch assembly for an automatic transmission, comprising:
    a cylinder element (2);
    an actuating piston (3) disposed within the cylinder element (2), the actuating piston (3) configured for actuating a shifting element (1), the actuating piston (3) being axially movable; and
    an oil dam (5),
    wherein a compensating cavity (4) of the shifting element (1) is provided between the actuating piston (3) and the oil dam (5), and
    wherein the oil dam (5) is fixed radially outside a piston face (6) of the actuating piston (3),
    wherein the oil dam (5) has a radially projecting driving profile (7) on an outer diameter of the oil dam (5), the radially projecting driving profile (7) engaging into a driving spline (8) of the cylinder element (2), and
    wherein the driving profile (7) of the oil dam (5) has a plurality of driving teeth (9), the plurality of driving teeth (9) distributed over a circumference of the driving profile (7), the driving profile (7) of the oil dam (5) also having a recess (10), the actuating piston (3) extending axially into the recess (10), the recess (10) positioned radially outside a seal diameter of the oil dam (5) and between respective adjacent driving teeth of the plurality of driving teeth (9).

2. The clutch assembly of claim 1, wherein an axial securing means of the oil dam (5) is positioned on an outer diameter of the oil dam (5).

3. The clutch assembly of claim 2, wherein the axial securing means is a snap ring (11).

4. The clutch assembly of claim 3, wherein the snap ring (11) bears on an axial side against outer ends of a plurality of driving teeth (9) of the oil dam (5).

5. The clutch assembly of claim 1, wherein an eject diameter of the oil dam (5) is provided on an inner diameter of the oil dam (5) by an angled-away open end (15) of the oil dam (5).

6. The clutch assembly of claim 1, wherein the shifting element (1) is a multi-disk clutch (1), the cylinder element (2) being an outer disk carrier of the multi-disk clutch (1), a driving spline (8) of the outer disk carrier holding outer clutch disks (14) of the multi-disk clutch (1), the multi-disk clutch (1) having an inner disk carrier (12) for holding internal clutch disks (13) of the multi-disk clutch (1), the oil dam (5) being fastened by the driving profile (7) of the oil dam (5) to the driving spline (8) of the outer disk carrier, the driving spline (8) of the outer disk carrier positioned radially outside of the driving profile (7) of the oil dam (5).

* * * * *